(12) United States Patent
Schneebeck et al.

(10) Patent No.: US 11,579,330 B2
(45) Date of Patent: Feb. 14, 2023

(54) METHOD AND APPARATUS FOR EXAMINING SHIPMENTS

(71) Applicants: Holger Schneebeck, Cologne (DE); Dirk Hagemann, Bonn (DE)

(72) Inventors: Holger Schneebeck, Cologne (DE); Dirk Hagemann, Bonn (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/297,200

(22) Filed: Mar. 8, 2019

(65) Prior Publication Data
US 2019/0278000 A1 Sep. 12, 2019

(30) Foreign Application Priority Data
Mar. 8, 2018 (DE) .................. 10 2018 105 352.5

(51) Int. Cl.
G01V 8/20 (2006.01)
G01N 21/59 (2006.01)
G01N 21/3581 (2014.01)
G01N 21/84 (2006.01)

(52) U.S. Cl.
CPC ........... *G01V 8/20* (2013.01); *G01N 21/3581* (2013.01); *G01N 21/59* (2013.01); *G01N 2021/845* (2013.01)

(58) Field of Classification Search
CPC ......... G01N 2021/845; G01N 21/3581; G01N 21/59; G01V 8/20
See application file for complete search history.

(56) References Cited

U.S. PATENT DOCUMENTS

| 2002/0126008 | A1 | 9/2002 | Lopez et al. |
| 2006/0022140 | A1* | 2/2006 | Connelly ............... G01V 8/005 250/338.1 |
| 2006/0255277 | A1* | 11/2006 | Cole ................... G01N 21/3581 250/341.1 |
| 2007/0235658 | A1 | 10/2007 | Zimdars et al. |
| 2010/0171835 | A1* | 7/2010 | Kasai .................. G01N 21/255 348/162 |

(Continued)

FOREIGN PATENT DOCUMENTS

| CN | 102681022 A | 9/2012 |
| CN | 102681023 A | 9/2012 |

(Continued)

OTHER PUBLICATIONS

Spiegel Online, MIT: Scanner reads closed book with terahertz radiation, Sep. 13, 2016, 10 pages (including translation) http://www.spiegel.de/wissenschaft/technik/mit-scanner-liest-geschlossenes-buch-mit-terahertz-strahlung-a-1111993.html.

(Continued)

*Primary Examiner* — Marcus H Taningco
(74) *Attorney, Agent, or Firm* — Reinhart Boerner Van Deuren P.C.

(57) ABSTRACT

Embodiments of a method for examining shipments are disclosed herein. In the method, at least one shipment is arranged in an examination area. Radiation is emitted into the examination area for examining the at least one shipment by means of a radiation source. Radiation from the examination area is captured by means of a sensor device. The radiation source emits terahertz radiation, and the radiation source covers substantially the entire terahertz frequency spectrum from 1 terahertz to 6 terahertz.

19 Claims, 4 Drawing Sheets

(56) References Cited

U.S. PATENT DOCUMENTS

| | | | |
|---|---|---|---|
| 2011/0141468 A1 | 6/2011 | Kukushkin et al. | |
| 2012/0175521 A1 | 7/2012 | Chawla | |
| 2012/0217403 A1 | 8/2012 | Sartorius et al. | |
| 2012/0249782 A1 | 10/2012 | Oda et al. | |
| 2013/0265415 A1 | 10/2013 | Oda et al. | |
| 2014/0232931 A1 | 8/2014 | Oda et al. | |
| 2014/0264024 A1* | 9/2014 | Nakayama | G01N 21/9508 250/338.1 |
| 2014/0367316 A1* | 12/2014 | Saeedkia | B07C 5/34 209/577 |
| 2015/0204717 A1 | 7/2015 | Saeedkia et al. | |
| 2016/0109360 A1* | 4/2016 | Koizumi | G01N 21/59 250/338.1 |
| 2016/0131889 A1 | 5/2016 | Morimoto et al. | |
| 2017/0187932 A1 | 6/2017 | Marchese et al. | |
| 2017/0295323 A1* | 10/2017 | Millar | B07C 5/3416 |
| 2019/0259791 A1* | 8/2019 | Itsuji | H01L 27/14605 |
| 2020/0249156 A1* | 8/2020 | Wu | G06N 20/00 |

FOREIGN PATENT DOCUMENTS

| | | | |
|---|---|---|---|
| CN | 103308538 A * | 9/2013 | |
| CN | 104950340 A | 9/2015 | |
| CN | 105954227 A | 9/2016 | |
| CN | 106198445 A | 12/2016 | |
| DE | 10 2007 006 082 A1 | 8/2008 | |
| DE | 10 2007 031 959 A1 | 1/2009 | |
| DE | 10 2013217 314 A1 | 3/2015 | |
| EP | 2 194 374 A1 | 6/2010 | |
| EP | 2 629 081 A1 | 8/2013 | |
| GB | 2509387 A | 7/2014 | |
| JP | 2007-198802 A | 8/2007 | |
| JP | 2012-21880 A | 2/2012 | |
| WO | WO 03/102518 A2 | 12/2003 | |
| WO | WO 2005/119214 A1 | 12/2005 | |
| WO | WO 2012/059210 A1 | 5/2012 | |
| WO | WO 2013/029746 A1 | 3/2013 | |
| WO | WO 2013/086608 A1 | 6/2013 | |
| WO | WO 2013/117920 A2 | 8/2013 | |
| WO | WO 2014/086335 A1 | 6/2014 | |
| WO | WO 2016/063380 A1 | 4/2016 | |
| WO | WO 2016/142976 A1 | 9/2016 | |
| WO | WO 2016/197278 A1 | 12/2016 | |
| WO | WO 2017/094280 A1 | 6/2017 | |
| WO | WO 2017/140729 A1 | 8/2017 | |
| WO | WO 2017/173533 A1 | 10/2017 | |

OTHER PUBLICATIONS

Albert Redo-Sanchez et al., Terahertz time-gated spectral imaging for content extraction through layered structures, Nature Communications, Sep. 6, 2016, 7 pages http://www.nature.com/articles/ncomms12665.

Youtube, DIY X-ray backscatter imaging system (airport body scanner), Nov. 26, 2012, Internet Website, 1 page (first video frame only) https://www.youtube.com/watch?v=H7IdYhzKAp4.

Albert Redo-Sanchez et al., Terahertz time-gated spectral imaging for content extraction through layered structures, Nature Communications, Sep. 9, 2016, 7 pages http://www.nature.com/articles/ncomms12665.

* cited by examiner

METHOD AND APPARATUS FOR EXAMINING SHIPMENTS

CROSS-REFERENCE TO RELATED PATENT APPLICATION

This patent application claims priority to German Application No. 10 2018 105 352.5, filed Mar. 8, 2018, the entire teachings and disclosure of which are incorporated herein by reference thereto.

FIELD OF THE INVENTION

The invention relates to a method and an apparatus for examining shipments, for example small item shipments, in particular with regard to the shipment content, as can be carried out in parcel centres, for example. The invention also relates to a computer program.

BACKGROUND OF THE INVENTION

When processing shipments, that is to say, for example, correspondence or small item shipments, for instance postcards, letters, packages or parcels, or else further cargo to be shipped such as pallets or containers, for instance Unit Load Devices (ULDs), it may be necessary to examine the respective shipment during processing. It may specifically be desirable or necessary to determine pieces of information relating to the respective shipment.

On the one hand, it may be necessary, for example, to determine particular printed pieces of information or pieces of geometrical information such as dimensions. However, printed pieces of information may be concealed under certain circumstances. Three-dimensional capture of the geometry for processing the shipment is desirable or necessary in the case of small item shipments, in particular. It is likewise desirable for not only externally visible pieces of information (for instance the dimensions of the shipment) but also pieces of information relating to the content of the shipment to be captured. This is the case, in particular, for shipments in the form of containers, pallets or small item shipments since very different contents may be shipped here, for instance perishable contents (for example food), sensitive contents (for example moisture-sensitive or temperature-sensitive contents) or else, under certain circumstances, hazardous or prohibited contents (for example chemicals, gases, explosives, weapons or the like). Information not only relating to the exterior of the shipment but also relating to the shipment content is therefore desirable when processing shipments.

The prior art, for example US 2002/0126008 A1, discloses detecting hazardous contents of shipments using sensors. The detection can be carried out using an olfactory sensor, a UV or infrared detector, an x-ray machine, a laser, a radio sensor or a heat sensor. The disadvantage of this is, on the one hand, that these detectors are very specific. For example, although particular contents of a shipment can be made visible by providing an x-ray machine, no spectroscopic analysis of substances or the establishment of a humidity level of an object can be determined, for example. A comprehensive image of the shipment or the shipment content would rather require a correspondingly large number of sensors, which would make the examination of the shipment very time-consuming and has a negative effect on the efficiency of the shipment processing, in particular if a very large number of shipments are to be examined. Opening of the shipment is generally neither economical nor allowed, apart from a few exceptions.

BRIEF DESCRIPTION OF SOME EXEMPLARY EMBODIMENTS OF THE INVENTION

Against this background, the invention is based on the object of specifying a method and an apparatus for examining shipments, with which a shipment and, in particular, the shipment content can be examined in an economical manner with regard to different aspects, that is to say, in particular, with little outlay in terms of apparatus and at high speed. The intention is also to specify an advantageous computer program.

According to a first aspect, the object is achieved by means of a method, the method comprising:
   arranging at least one shipment in an examination area;
   emitting radiation into the examination area for examining the at least one shipment by means of a radiation source;
   capturing radiation from the examination area by means of a sensor device; wherein the radiation source emits terahertz radiation, and wherein the radiation source covers substantially the entire terahertz frequency spectrum from 1 terahertz to 6 terahertz.

According to a second aspect, the object is also achieved by means of an apparatus for examining shipments, in particular for carrying out a method according to the invention,
   having an examination area for at least one shipment,
   having a radiation source for emitting radiation into the examination area for examining the at least one shipment, and
   having a sensor device for capturing radiation from the examination area, wherein the radiation source is a terahertz radiation source which covers substantially the entire terahertz frequency spectrum from 1 terahertz to 6 terahertz.

According to a third aspect, the object is also achieved by means of a computer program comprising program instructions which cause a processor to perform and/or control a method according to the invention when the computer program runs on the processor.

At least one shipment is first of all arranged in an examination area. As already explained at the outset, a shipment may be, for example, correspondence (for example a postcard or a letter), a small item shipment (for example a package or parcel) or else larger cargo, for example a pallet or a container (for instance a ULD). A shipment may therefore have, in particular, packaging or outer packaging, for example made from paper, cardboard, plastic and/or textiles. The shipment content, for example one or more objects or articles to be shipped, which for their part in turn can possibly have packaging, is inside the packaging. The shipments are advantageously separated before arrangement in the examination area, with the result that separated or individual shipments are preferably arranged there or one shipment after the other can be arranged in the examination area. However, it is likewise possible and preferred if a plurality of shipments are arranged together in the examination area. This may be the case, in particular, if a plurality of shipments are conveyed together (for instance a parcel or a container), with the result that shipments arranged therein cannot be separated or can be separated only in a complicated manner. During arrangement in the examination area, the at least one shipment may come to a standstill in the examination area, for example, but the shipment can also pass through or cross the examination area without a standstill. For example, the shipment is moved in a substantially linear manner in a transport direction in order to be moved into and out of the examination area.

For example, the method or the apparatus can be used to examine shipments in a shipping centre, a transhipment centre, a parcel centre or a sorting centre.

In this case, radiation from a radiation source is emitted into the examination area for examining the at least one shipment. The examination area is, for example, the area covered by the radiation from the radiation source. In this case, the radiation source may comprise one or more emitters for emitting the radiation, as is also described in yet more detail below. The shipment in the examination area can be at least partially irradiated with the emitted radiation by the radiation source.

Finally, radiation emitted by the radiation source can be captured from the examination area by means of a sensor device. The radiation is, for example, radiation which is emitted by the radiation source and was (partially) transmitted by the shipment and/or reflected at the shipment or the shipment content. An examination result can be obtained by emitting radiation from the radiation source into the examination area and capturing radiation from the examination area. This examination result may comprise, for example, measurement data from one or more measurements of the sensor device. Further processing or analysis steps may have likewise already been carried out with the measurement data from the sensor device, the result of which steps can then represent the examination result. Examples of examination results are, for instance, geometrical information, article information, substance information, written information and/or state information, in particular of the shipment content, as is described in yet more detail below.

On the one hand, provision is now made for the radiation source to be a terahertz radiation source or to emit terahertz radiation. On the other hand, provision is made for the radiation or the radiation source to cover substantially the entire terahertz frequency spectrum from 1 terahertz to 6 terahertz. The statement that substantially the entire stated spectrum is covered is understood as meaning, in particular, the fact that at least 90%, preferably at least 95%, more preferably at least 99%, of the frequencies are covered. However, it is likewise possible and also preferred for a larger part of the terahertz frequency spectrum (for instance substantially the entire terahertz frequency spectrum from 1 terahertz to 30 terahertz) to be covered, as is also described further below.

The use of the terahertz radiation makes it possible to carry out a contactless and non-destructive examination ("non-destructive testing"), that is to say analysis or inspection of the shipment and therefore of the shipment content, in particular. Materials typically used for the packaging such as paper, cardboard, plastic or textiles can be penetrated in this case. As a result of the fact that the terahertz radiation source covers substantially the entire stated terahertz frequency spectrum, various pieces of information relating to the shipment and, in particular, the shipment content can be obtained by means of only one apparatus or examination. Although a broad range of articles to be examined is associated with shipment processing and a restriction or a certain expectation of the shipment content is also generally not possible in advance, the method according to the invention has proven to be advantageous against the background of the typically desired pieces of information and examination results can be achieved with little outlay in terms of apparatus and at high speed.

The coverage of the terahertz frequency spectrum need not be completely contiguous in this case. Rather, individual non-contiguous terahertz frequency ranges may be present. The same intensity likewise need not be achieved in each terahertz frequency range covered. In one example, a terahertz frequency or a terahertz frequency range can be considered to be covered if at least 1%, preferably 10%, more preferably 50% or even 80%, of the intensity maximum of the emitted terahertz spectrum is achieved at the terahertz frequency or in the terahertz frequency range.

In this case, the terahertz radiation source may be a radiation source suitable for generating the desired terahertz radiation. The terahertz radiation source may generate, for example, continuous terahertz radiation and/or pulsed terahertz radiation. Conceivable terahertz radiation sources are or are based, for example, on the frequency multiplication (for instance with the aid of GaAs Schottky diodes) or the formation of the difference frequency of two laser signals (for example distributed feedback lasers) in non-linear components. Quantum cascade lasers, molecular gas lasers, free electron lasers, optical parametric oscillators or backward wave oscillators are likewise possible. Laser pulses may likewise generate terahertz radiation in semiconductors or non-linear optical materials. Combinations of these for generating the terahertz radiation are also conceivable. It is likewise preferred if a sufficient power can be achieved at room temperature, with the result that the method can be carried out at room temperature without using liquid nitrogen for cooling the terahertz radiation source, for example.

It is fundamentally possible to provide yet further radiation sources which need not necessarily be terahertz radiation sources (for example an x-ray source, a laser source or an infrared source) and are likewise used to examine the at least one shipment. However, it has been found to be advantageous that a terahertz radiation source may be the only radiation source and can advantageously replace further radiation sources (for instance an x-ray source or a six-sided laser scanner) with little outlay in terms of apparatus.

The sensor device may comprise one or more sensors. The sensor device is tuned to the radiation source, in particular. That is to say, the sensor device can be considered, in particular, to be a sensor device for detecting terahertz radiation (terahertz sensor device). For example, the sensor device can detect at least those frequencies from the terahertz frequency spectrum which are emitted by the radiation source. The sensor device can carry out, for example, time-resolving, position-resolving and/or frequency-resolving measurements. For example, the sensor device may comprise one or more bolometers, in particular one or more microbolometer arrays, which can be advantageously used to carry out position-resolving measurements, in particular at room temperature.

According to one preferred configuration of the different aspects of the invention, the terahertz radiation source covers substantially the entire terahertz frequency spectrum from 0.5 terahertz, preferably from 0.3 terahertz, more preferably from 0.1 terahertz, and/or to 10 terahertz, preferably to 20 terahertz, more preferably to 30 terahertz. Extensive pieces of information relating to the shipment or a plurality of possible contents can be determined by covering the described ranges of the terahertz frequency spectrum.

According to one preferred configuration of the different aspects of the invention, the frequencies of the terahertz frequency spectrum which are covered by the radiation source are emitted at the same time or in an at least partially delayed manner. Simultaneous emission of the frequencies of the terahertz frequency spectrum which are covered by the terahertz radiation source can be achieved, for example, by means of one or more terahertz emitters which respectively cover the entire range of the terahertz range. It is likewise conceivable to use a plurality of terahertz emitters which respectively emit different ranges of the terahertz frequency spectrum and together cover the desired frequencies of the terahertz frequency spectrum. This makes it possible to achieve a short examination time. Delayed emission of the frequencies of the terahertz frequency spectrum which are covered by the terahertz radiation source can be carried out, for example, if, in the case of a plurality of terahertz emitters, the latter are activated in succession. It is likewise possible to use, for example, one or more tuneable terahertz emitters which can be tuned by means of at least some of the frequencies of the terahertz frequency spectrum which are covered by the radiation source and, in this manner, can emit the corresponding terahertz frequency spectrum with a time delay. This can reduce the number of required emitters.

According to one preferred configuration of the aspects of the invention, the terahertz radiation source comprises at least two terahertz emitters and the terahertz radiation is emitted by the at least two terahertz emitters. At least a first and a second terahertz emitter are therefore provided. Further terahertz emitters are likewise conceivable. The terahertz emitters can irradiate the examination area or the shipment at different heights and/or at different angles, for example. In order to effectively capture the radiation from the examination area, the number of sensors of the sensor device corresponds to the number of terahertz emitters of the terahertz radiation source in one example. For example, the sensors of the sensor device are at least partially arranged opposite the emitters of the terahertz radiation source.

According to one preferred configuration of the different aspects of the invention, at least one terahertz emitter of the radiation source emits the terahertz radiation in broadband. As a result, only a small number of terahertz emitters is needed to emit the frequencies of that range of the terahertz frequency spectrum which is to be covered. For example, a terahertz emitter respectively emits with a frequency bandwidth of at least 6 THz, at least 10 THz or at least 30 THz. It is likewise conceivable for a terahertz emitter to emit terahertz radiation in the entire range to be covered.

Alternatively, however, it is also conceivable that the frequencies of that range of the terahertz frequency spectrum which is to be covered are covered by using an accordingly large number of individual terahertz emitters which emit in narrowband.

According to one preferred configuration of the different aspects of the invention, the terahertz radiation source is tuned. The terahertz radiation source of the apparatus is tuneable for this purpose. As a result, frequencies can be specifically set and emitted by an emitter (with a time delay). For example, individual or all terahertz emitters provided are tuneable, for example over a frequency range of at least 3 THz, at least 6 THz or at least 10 THz.

If a high frequency tuning range is required, it is possible, for example, to use a photomixer which converts the difference frequency of two lasers into alternating current which is finally emitted by a suitable antenna. Examples of these are low-temperature-grown GaAs, unitravelling carrier photodiodes, and n-i-pn-i-p superlattice photodiodes.

According to one preferred configuration of the different aspects of the invention, geometrical information and/or written information of the shipment and/or of one or more objects inside the shipment is determined by means of the radiation which is captured by the sensor device from the examination area.

An object inside the shipment is understood as meaning an object inside outer packaging of the shipment. Geometrical information may be, for example, information representative of the shape and/or size of the shipment and/or of one or more objects inside the shipment. The geometrical information can also be, for example, a representation substantially of the entire object geometry (a 3-D image). The determined geometrical information of the shipment can be used in a particularly advantageous manner to control a conveyor system used to transport the shipments. In other words, the determined geometrical information of the shipment is used as an input variable for controlling the conveyor system. Six-sided scanners previously used for this purpose are then no longer necessary, for example.

Written information is understood as meaning, in particular, information representative of writing on the shipment or on an object in the shipment. In this case, it may be, for example, human-readable and/or machine-readable writing. Writing on the shipment may comprise shipping information, for example. Writing on an object in the shipment can be used, in particular, when determining article information, substance information or state information, as described below.

According to one particularly preferred configuration of the different aspects of the invention, article information, substance information and/or state information of one or more objects or substances inside the shipment is determined by means of the radiation which is captured by the sensor device from the examination area.

Article information is understood as meaning, in particular, information representative of a type, a nature or a category of an article inside the shipment. For example, the article information allows categorization of the article. Examples of such a type, such a nature or such a category of an article are "food", "cooking salt packet", "electronic device", "weapon", "rechargeable battery", "permitted article", "prohibited article", etc., to name just a few examples.

Substance information is understood as meaning, in particular, information representative of a type, a nature or a category of a substance inside the shipment. In this case, pieces of information relating to substances in containers inside the shipment can be determined, in particular. For example, the substance information allows categorization of the substance. Examples of such a type, such a nature or such a category of a substance are "cooking salt", "ammonium nitrate", "explosive", "permitted substance", "prohibited substance" etc., to name just a few examples. As a result, it is no longer necessary to use a near-infrared spectrometer, for example.

State information is understood as meaning, in particular, information representative of a possible state or a state category of an object or substance inside the shipment. For example, the state information allows categorization of the object or substance. Examples of such a possible state or such a state category are the moisture content or the freshness of an object or substance (for example of food, which can be determined by the water content, for instance).

The pieces of information described herein can be determined, in particular, at least partially on the basis of the transmission, the reflection and/or the absorption of the terahertz radiation by the shipment and/or the object inside the shipment. In this case, the transmission, the reflection and/or the absorption (for example the transmittance, the reflectance and/or the absorbance) can be determined in a position-resolved, time-resolved and/or frequency-resolved manner. The detection of metal (for example for identifying a rechargeable battery or a weapon) by way of the reflection properties of metal in the terahertz spectrum is suitable, for example. The property of water of absorbing terahertz radiation lends itself, for example, to identifying objects with a water content (liquids, food such as fruit or vegetables) and to identifying the state thereof. For example, spectral analyses (spectroscopy) lend themselves to identifying substances (for example explosive, gases). Explosives or drugs in containers can therefore be identified, for example, since they have characteristic absorption spectra above 0.5 THz.

According to one preferred configuration of the different aspects of the invention, the method also comprises checking whether at least one shipment is in the examination area, preferably by means of the radiation source and the sensor device. For example, the radiation source emits continuous or (regularly) pulsed terahertz radiation for this purpose and checks the presence of at least one shipment in the examination area using the sensor device. The terahertz radiation used for this purpose is of low power or intensity (for example lower than a subsequently used power or intensity), for example. The presence of a shipment can be advantageously determined in this manner without further apparatuses.

According to one preferred configuration of the different aspects of the invention, for checking whether at least one shipment is in the examination area, the radiation source emits terahertz radiation with a first radiation property. The radiation property may be the intensity or the power, for example. This radiation property differs, for example, from a second radiation property which is subsequently used. In the case of the intensity or power, a lower intensity or power than in the case of subsequently used terahertz radiation with a second radiation property is used to examine the shipment, for example. However, geometrical information of the shipment, as already described, can preferably already be determined by the terahertz radiation with the first radiation property.

According to one preferred configuration of the different aspects of the invention, if the checking reveals that at least one shipment is in the examination area, the radiation source emits terahertz radiation with a second radiation property. As described, the radiation property may be, in particular, the intensity or power of the terahertz radiation which may be higher, in particular, than that of the terahertz radiation for checking whether at least one shipment is in the examination area. The terahertz radiation with the second radiation property can be used to carry out the already described examination of the at least one shipment in the examination area, for example in order to determine geometrical information, written information, article information, substance information or state information.

According to one preferred configuration of the different aspects of the invention, for examining the at least one shipment, terahertz radiation of different power or intensity is emitted into the examination area. The power or intensity is understood as meaning, in particular, the average or maximum power or intensity. This makes it possible to take into account the fact that there is a need, under certain circumstances, for different powers or intensities for examining different shipments or different articles in the latter.

For example, an examination with low power or intensity can be carried out first of all and then an examination with higher power or intensity.

According to one preferred configuration of the different aspects of the invention, for examining the at least one shipment, terahertz radiation with a first power or intensity can first of all be emitted and, in particular if it is determined that the terahertz radiation with the first power or intensity does not suffice to examine the at least one shipment, terahertz radiation with a second power or intensity higher than the first power or intensity can then be emitted into the examination area. The terahertz radiation with the first power or intensity can be considered to be insufficient, for example, if the sensor unit does not capture a signal or captures an excessively low signal of terahertz radiation from the examination area.

According to one preferred configuration of the different aspects of the invention, an examination result of a shipment examined by means of the radiation source and the sensor device in the examination area is compared with reference information and/or reference information is modified and/or enriched on the basis of the examination result.

An examination result may comprise, for example, measurement data from one or more measurements of radiation captured by the sensor device from the examination area. An examination result may be, for example, geometrical information, written information, article information, substance information and/or state information which is determined as described. The reference information may be based, for example, on measurement data from reference measurements or measurement data from previous measurements. The reference information is stored in a database, for example. The reference information is stored locally in the apparatus carrying out the method (for example in a control computer of the apparatus) or in a central server, for example. The examination result can be transmitted to the server, for example, with the result that the comparison can be carried out by the server.

As a result of the fact that pieces of reference information can be alternatively or additionally modified and/or enriched on the basis of the examination result, the reference information can be updated. The reference information can be modified and/or enriched by means of an adaptive algorithm, in particular. For example, the reference information is modified and/or enriched by machine learning, for example on the basis of monitored or unmonitored learning, for example on the basis of a neural network. To name one example, the (learnt) reference information can specify, for example, that cooking salt, for example, should be contained (or previously always was contained) in particular packaging, but unknown content or other content is now found. This may result in the article being classified as an unknown or prohibited article, for example.

According to one preferred configuration of the different aspects of the invention, the at least one shipment is transported by means of a conveyor system into and/or out of the examination area, in particular through the examination area. The apparatus therefore preferably also comprises a conveyor system for transporting the shipments into and/or out of the examination area and passes through the examination area, in particular. The conveyor system comprises, for example, a belt conveyor and/or a roller conveyor, for example. In this case, the apparatus may be in the form of a gate, for example, wherein the conveyor system passes through the apparatus.

According to one preferred configuration of the different aspects of the invention, the at least one shipment is slowed down and/or stopped before and/or in the examination area. As a result, the at least one shipment is in the examination area for a longer time, which enables more time for the examination and can improve the quality of the examination result.

This can be advantageously achieved, for example, by virtue of the fact that, according to one preferred configuration of the different aspects of the invention, the examination area is arranged in a separation area of the conveyor system. This makes it possible to ensure, in particular, that only one shipment is respectively in the examination area at the same time.

According to one preferred configuration of the different aspects of the invention, the radiation source and/or the sensor device or a part thereof is/are moved during the examination relative to a shipment arranged in the examination area, in particular transversely with respect to a transport direction of a shipment arranged in the examination area, and is/are preferably rotated around a shipment arranged in the examination area. The terahertz radiation source and/or the sensor device can therefore be designed, in particular, to be movable with respect to a shipment arranged in the examination area, in particular to be rotatable around a shipment arranged in the examination area. The transport direction of a shipment is determined, for example, substantially by the conveyor system used to transport the shipment. For example, the terahertz radiation source or the at least one terahertz emitter and/or the sensor device or the at least one sensor is/are arranged around the examination area. As a result, the at least one shipment can be irradiated from different sides and angles, for example.

Alternatively, however, it is likewise possible for the terahertz radiation source and/or the sensor device to be arranged in a stationary manner, for example to the side of and/or above the conveyor means.

The exemplary configurations of the present invention which are described above in this description are also intended to be understood as having been disclosed in all combinations with one another. In this case, the previous and following description of method steps according to preferred embodiments of the method are also intended to disclose corresponding means for carrying out the method steps by means of preferred embodiments of the apparatus. The disclosure of means for carrying out a method step is likewise intended to disclose the corresponding method step.

Further advantageous exemplary configurations of the invention can be gathered from the following detailed description of some exemplary embodiments of the present invention, in particular in conjunction with the figures. However, the figures are intended to be used only for the purpose of illustration, but not to determine the scope of protection of the invention. The figures are not true to scale and are intended to only reflect the general concept of the present invention in an exemplary manner. In particular, features which are included in the figures are not intended to be in any way considered a necessary part of the present invention.

DETAILED DESCRIPTION OF SOME EXEMPLARY EMBODIMENTS OF THE INVENTION

Figure 1:
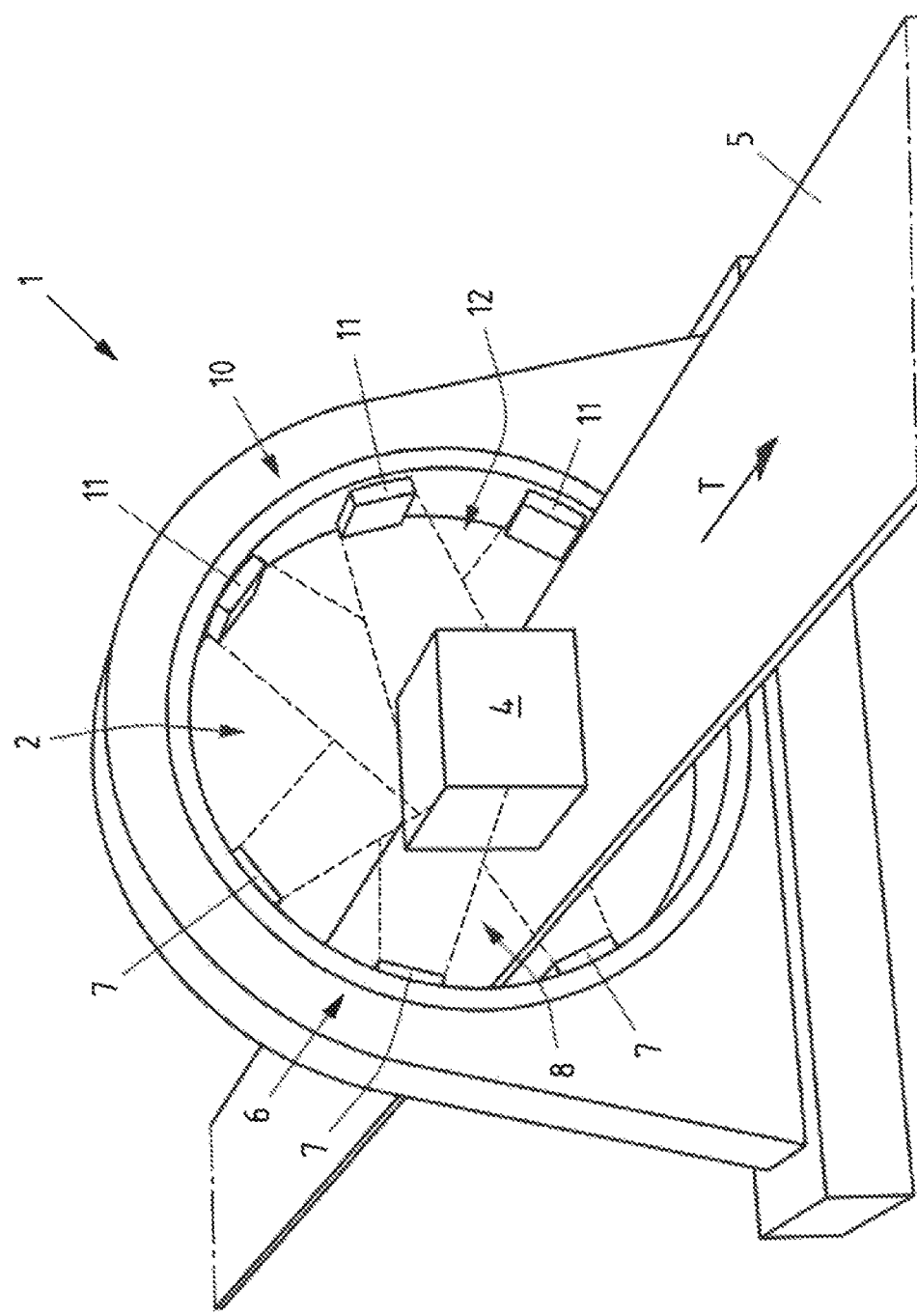
FIG. 1 shows a perspective view of an exemplary embodiment of an apparatus according to the invention.

FIG. 1 first of all shows a perspective view of an exemplary embodiment of an apparatus 1 for examining shipments according to the invention. The apparatus 1 is configured to carry out exemplary embodiments of the method according to the invention.

The apparatus 1 comprises an examination area 2 for at least one shipment 4 which is illustrated here, by way of example, as a separated parcel. The shipment 4 can be transported through the examination area 2 along the transport direction T by means of a conveyor system 5, here a parcel belt, and can therefore be arranged in the examination area 2. The shipment 4 can be slowed down before the examination area 2, for example, or else can be stopped in the examination area 2 if necessary for examination.

The apparatus 1 also comprises a terahertz radiation source 6 with terahertz emitters 7 for emitting radiation 8 into the examination area 2 for examining the at least one shipment 4. The apparatus 1 likewise comprises a sensor device 10 with terahertz sensors 11 for capturing radiation 12 from the examination area 2. In this case, the terahertz radiation source 6 covers substantially the entire terahertz frequency spectrum, in any event from 1 terahertz to 6 terahertz. However, substantially the entire terahertz frequency spectrum from 1 terahertz or even 0.3 terahertz to 10, 20 or 30 terahertz is preferably covered.

In this example, the radiation source 6 and the sensor device 10 are provided such that these or the terahertz emitters 7 and the sensors 11 are opposite and are rotatable around the shipment 4 and in a manner perpendicular to the transport direction T.

Figure 2B:
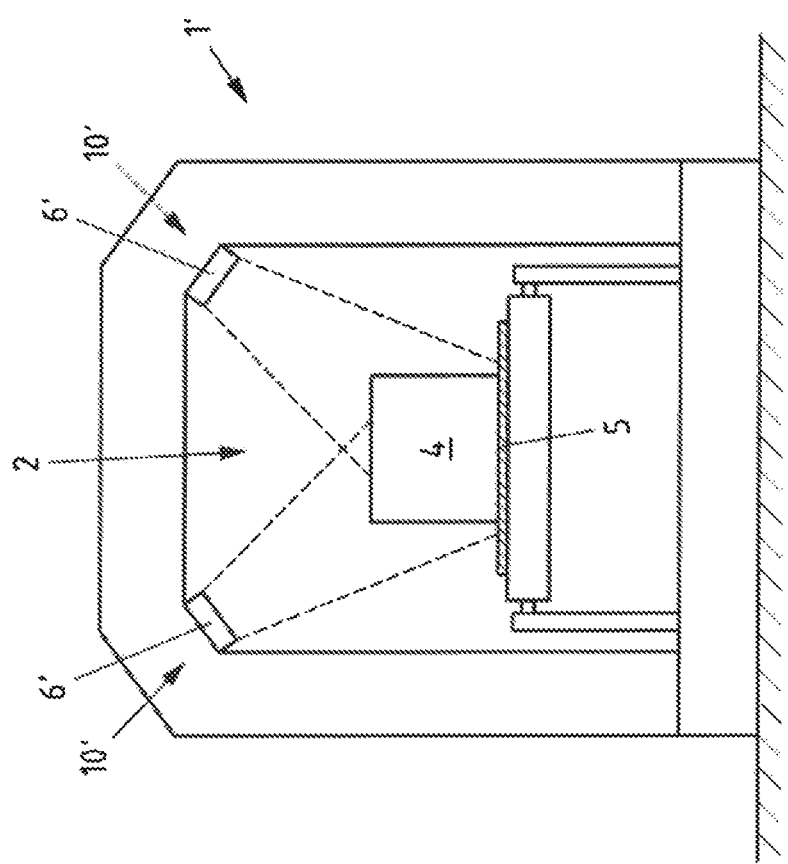
FIGS. 2a, b show a side view and a front view of a further exemplary embodiment of an apparatus according to the invention.
Figure 2A:
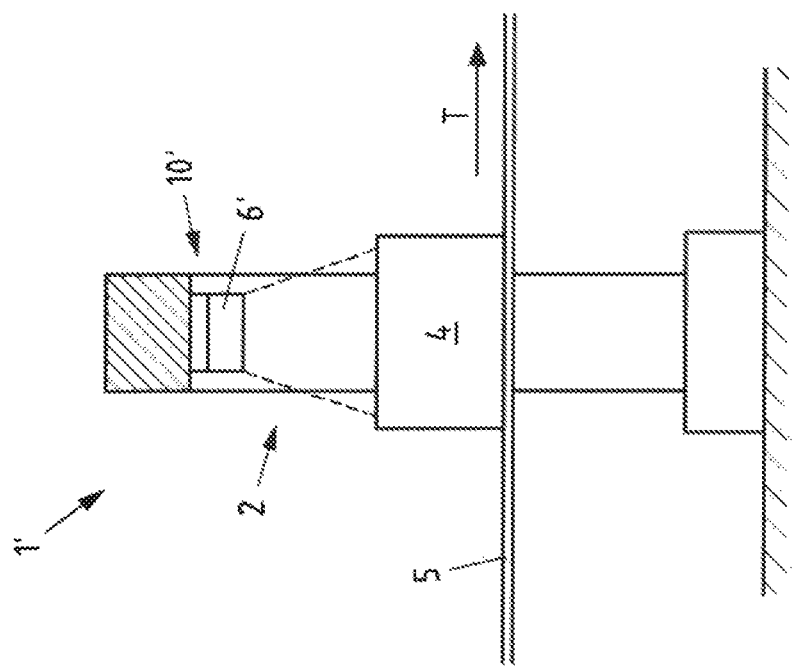

Alternatively, however, the arrangement illustrated by way of example in FIG. 2 is also possible. FIG. 2 shows a side view (FIG. 2a) and a front view (FIG. 2b) of a further exemplary embodiment of an apparatus 1' according to the invention.

The apparatus 1 in FIG. 2 is also configured to carry out exemplary embodiments of the method according to the invention.

The apparatus 1' likewise comprises an examination area 2 for at least one shipment 4, here likewise a separated parcel. The shipment 4 can be transported through the examination area 2 along the transport direction T by means of the conveyor system 5 and can therefore be arranged in the examination area 2. In this case too, the shipment 4 can be slowed down before the examination area 2, for example, or else can be stopped in the examination area 2 if necessary for examination.

The apparatus 1' also comprises a terahertz radiation source 6' with terahertz emitters 7' for emitting radiation 8 into the examination area 2 for examining the at least one shipment 4. The apparatus 1' likewise comprises a sensor device 10' with terahertz sensors 11' for capturing radiation 12 from the examination area 2. In this case, the terahertz radiation source 6' also covers substantially the entire terahertz frequency spectrum, in any case from 1 terahertz to 6 terahertz or more.

In contrast to the exemplary embodiment shown in FIG. 1, the terahertz radiation source 6' and the sensor device 10' in this example are provided such that these or the terahertz emitters and the sensors (not illustrated) are arranged above the shipment 4 and in a stationary manner. In this case, the radiation source 6' and the sensor device 10' are in the form of an assembly.

Figure 3:
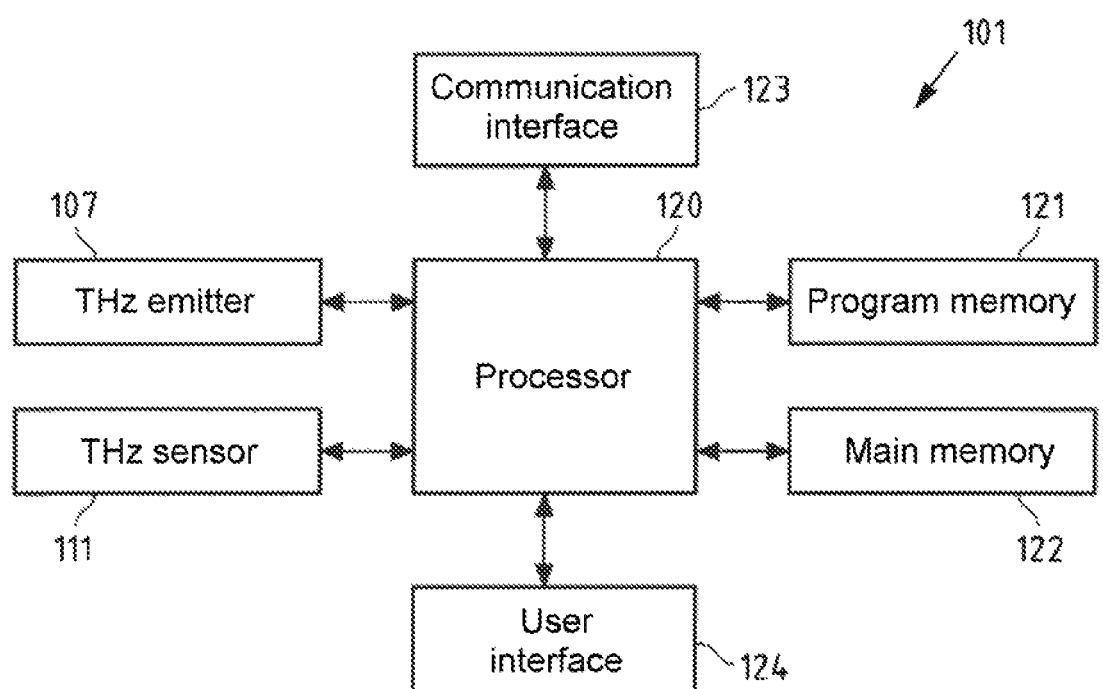
FIG. 3 shows a block diagram of an exemplary embodiment of an apparatus according to the invention.

FIG. 3 shows a block diagram of an apparatus 101 which may likewise be an exemplary embodiment of an apparatus according to the invention or represents the hardware components of the apparatuses 1 and 1' in FIGS. 1 and 2. In this respect, the apparatuses 1, 1' may comprise, in particular, a control computer with the illustrated components. In this case, the apparatus 101 can perform the function of a client, for example. Alternatively, however, it is also possible for individual ones of the illustrated components to also be implemented by means of a (remote, central) server. In this case, the apparatus 101 can perform the function of a server, for example.

The processor 120 of the apparatus 101 is, in particular, in the form of a microprocessor, a microcontrol unit, a microcontroller, a digital signal processor (DSP), an application-specific integrated circuit (ASIC) or a field programmable gate array (FPGA).

A THz emitter 107 is illustrated in FIG. 3 as representative of the emitters 7 of the radiation source 6, 6'. A THz sensor 111 is also illustrated in FIG. 3 as representative of the sensors 11 of the sensor device 10, 10'. The processor 120 controls the THz emitter 107 and the THz sensor 111.

The processor 120 also executes program instructions stored in the program memory 121 and stores, for example, intermediate results or the like in the main memory 122. For example, the program memory 121 is a non-volatile memory such as a flash memory, a magnetic memory, an EEPROM (electrically erasable programmable read-only memory) and/or an optical memory. The main memory 122 is, for example, a volatile or non-volatile memory, in particular a random access memory (RAM) such as a static RAM (SRAM), a dynamic RAM (DRAM), a ferroelectric RAM (FeRAM) and/or a magnetic RAM (MRAM).

The program memory 121 is preferably a local data storage medium permanently connected to the apparatus 101. Data storage media permanently connected to the apparatus 101 are, for example, hard disks which are installed in the apparatus 101. Alternatively, the data storage medium may also be, for example, a data storage medium which is separably connectable to the apparatus 101 such as a memory stick, a removable data storage medium, a portable hard disk, a CD, a DVD and/or a floppy disk.

The program memory 121 contains, for example, the operating system of the apparatus 101, which operating system is at least partially loaded into the main memory 122 and is executed by the processor 120 when the apparatus 101 is started. In particular, at least one part of the core of the operating system is loaded into the main memory 122 and is executed by the processor 120 when the apparatus 1 is started. The operating system of the apparatus 1 is, for example, a Windows, UNIX, Linux, Android, Apple iOS and/or MAC operating system.

The operating system makes it possible, in particular, to use the apparatus 101 for data processing. The operating system manages, for example, operating resources such as the main memory 122 and the program memory 121, a communication interface 123, a user interface 124, provides other programs with fundamental functions by means of programming interfaces, inter alia, and controls the execution of programs.

Figure 4:
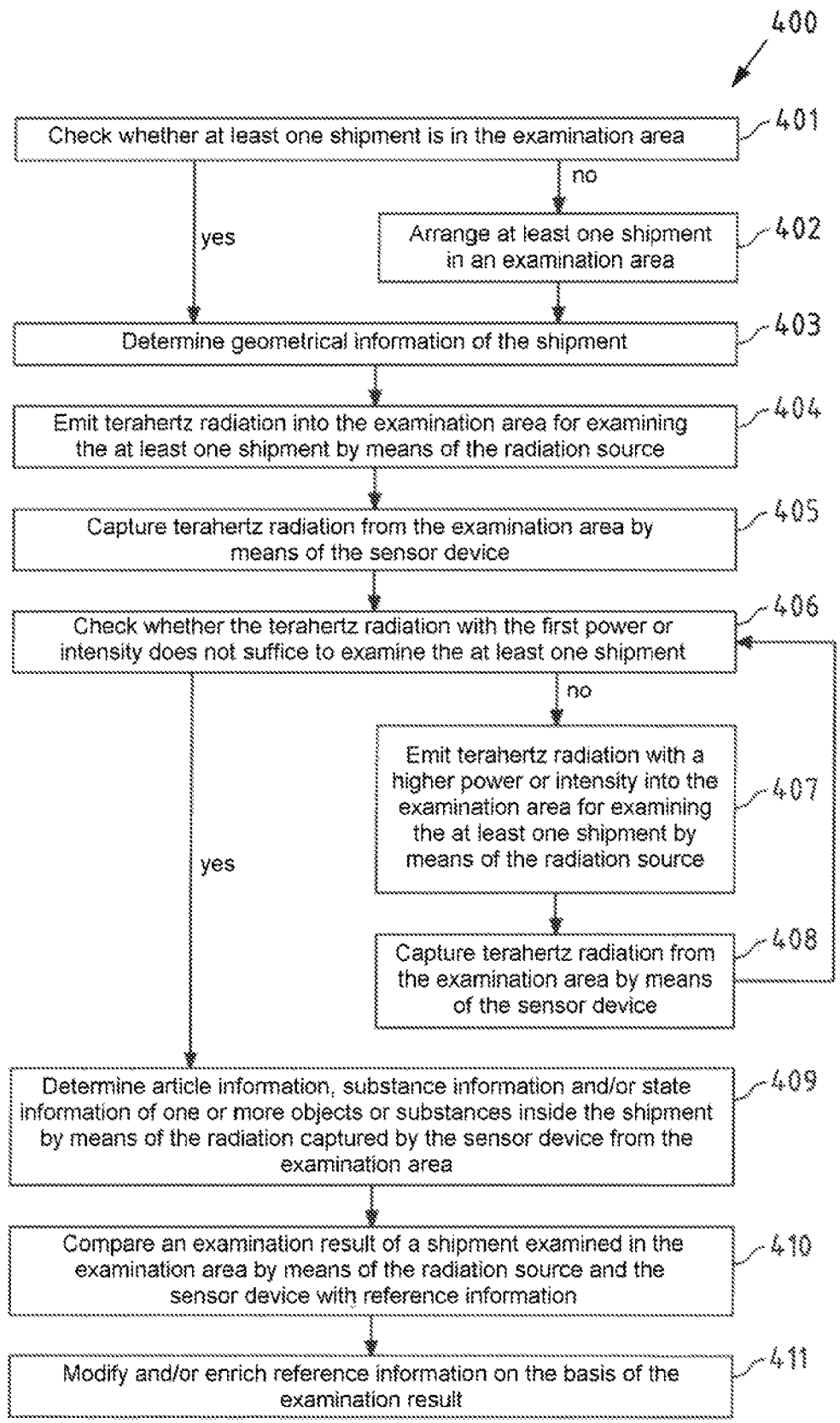
FIG. 4 shows a flowchart of an exemplary embodiment of a method according to the invention.

The program memory 123 and/or the main memory 122 can also receive reference information with which examination results of a shipment 4 examined in the examination area 2 by means of THz emitters 107 and THz sensors 111 can be compared, as described in yet more detail in connection with FIG. 4. The reference information can be stored in a database stored in the program memory, for example. Reference information can also be modified or enriched on the basis of the examination result. In this case, an adaptive algorithm can be used, for example. Machine learning can likewise be used in order to generate, change or enrich the reference information.

The processor 120 also controls the communication interface 123 which may be a network interface, for example, and may be in the form of a network card, and network module and/or a modem. The communication interface 123 is configured, in particular, to establish a connection between the apparatus 101 and other apparatuses, in particular via a (wireless) communication system, for example a network, and to communicate with said apparatuses. The communication interface 123 can receive data (via the communication system), for example, and can forward said data to the processor 120 and/or can receive data from the processor 120 and can transmit said data (via the communication system). Examples of a communication system are a local area network (LAN), a wide-area network (WAN), a wireless network (for example according to the IEEE 802.11 standard, the Bluetooth (LE) standard and/or the NFC standard), a wired network, a mobile radio network, a telephone network and/or the Internet.

The processor 120 can also control at least one input/output device 124. The input/output device 124 is, for example, a keyboard, a mouse, a display unit, a microphone, a touch-sensitive display unit, a loudspeaker, a reader, a disk drive and/or a camera. The input/output device 124 can receive inputs from a user, for example, and can forward them to the processor 120 and/or can receive pieces of information for the user from the processor 120 and can output said information.

FIG. 4 shows a flowchart 400 of an exemplary embodiment of a method according to the invention which can be carried out by the apparatuses 1, 1', 101, for example.

Checking in order to determine whether at least one shipment is in the examination area 2 is first of all carried out (action 401). This checking is preferably likewise carried out using the terahertz radiation source 6, 6' and the sensor device 10, 10'. For this purpose, THz radiation with a lower power or intensity (first radiation property) than for the subsequent examination is used, for example. However, a separate device would also be conceivable, in principle, for the checking.

If at least one shipment 4 was arranged in the examination area 2 (action 402), geometrical information of the shipment can be determined (action 403). This can be advantageously already carried out by means of the THz radiation emitted for checking whether at least one shipment is in the examination area 2. However, in this case too, it is possible, in principle, for THz radiation to be additionally emitted, for example, or even for a separate device to be used.

Terahertz radiation 8 is then emitted into the examination area 2 for examining the at least one shipment 4 by means of the radiation source 6, 6' (action 404). The terahertz radiation 12 from the examination area 2 is captured by means of the sensor device 10, 10' (action 405).

If checking (action 406) reveals that the terahertz radiation with the first power or intensity does not suffice to examine the at least one shipment, terahertz radiation 8 for examining the at least one shipment 4 can be emitted into the examination area 2 with a higher power or intensity by means of the radiation source 6, 6' (action 407) and can be captured from the examination area with the sensor device 10, 10' (action 408).

If the power or intensity suffices, article information, substance information and/or state information of one or more objects or substances inside the shipment 4 can be determined by means of the radiation 12 captured by the sensor device 10, 10' from the examination area 2 (action 409).

The article, substance or state can be identified by comparing (action 410) an examination result of a shipment 4 examined in the examination area 2 by means of the radiation source 6, 6' and the sensor device 10, 10' with reference information.

If appropriate, reference information is modified and/or enriched on the basis of the examination result if this is necessary (action 411).

The exemplary embodiments of the present invention described in this specification and the optional features and properties respectively cited in this respect should also be understood as having been disclosed in all combinations with one another. In particular, the description of a feature that an exemplary embodiment comprises is—unless explicitly explained to the contrary—also not intended to be understood, in the present case, as meaning that the feature is indispensable or essential for the function of the exemplary embodiment. The sequence of the method steps outlined in this specification in the individual flowcharts is not imperative, and alternative sequences of the method steps are conceivable. The method steps can be implemented in different ways, and implementation in software (by virtue of program instructions), hardware or a combination of the two is conceivable for implementing the method steps. Terms used in the patent claims such as "comprise", "have", "contain", "include" and the like do not exclude further elements or steps. The wording "at least partially" covers both the "partially" case and the "completely" case. The wording "and/or" is intended to be understood as meaning that both the alternative and the combination are intended to be disclosed, that is to say that "A and/or B" means "(A) or (B) or (A and B)". The use of the indefinite article does not exclude a plurality. A single device can carry out the functions of multiple units or apparatuses cited in the patent claims. Reference signs specified in the patent claims are not intended to be regarded as limitations for the means and steps employed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for examining shipments, the method comprising:
    arranging at least one shipment in an examination area;
    emitting radiation into the examination area for examining the at least one shipment by means of a radiation source;
    capturing radiation emitted by the radiation source from the examination area by means of a sensor device;
    wherein the radiation source, for an examination of the at least one shipment, emits terahertz radiation, covering substantially the entire terahertz frequency spectrum from 1 terahertz to 20 terahertz,
    wherein, by means of the terahertz radiation which is emitted by the radiation source and captured by the sensor device from the examination area, a) geometrical information of the shipment are determined and used for controlling a conveyor system transporting the at least one shipment and b) information about one or more objects or substances inside the shipment, including geometrical information of one or more objects inside the shipment, are determined, and
    wherein reference information can be modified and/or enriched on the basis of the examination result of a shipment examined by means of the radiation source and the sensor device in the examination area, said examination result comprising said geometrical information of one or more objects inside the shipment.

2. The method according to claim 1, wherein the radiation source covers substantially the entire terahertz frequency spectrum from 1 terahertz to 30 terahertz.

3. The method according to claim 1, wherein the frequencies of the terahertz frequency spectrum which are covered by the radiation source are emitted at the same time or in an at least partially delayed manner.

4. The method according to claim 1, wherein the terahertz radiation source comprises at least two terahertz emitters and the terahertz radiation is emitted by the at least two terahertz emitters.

5. The method according to claim 1, wherein at least one terahertz emitter of the radiation source emits the terahertz radiation in broadband.

6. The method according to claim 1, wherein the terahertz radiation source is tuned.

7. The method according to claim 1, wherein geometrical information and/or written information of one or more objects inside the shipment is determined by means of the radiation which is captured by the sensor device from the examination area.

8. The method according to claim 1, wherein article information, substance information and/or state information of one or more objects or substances inside the shipment is determined by means of the radiation which is captured by the sensor device from the examination area.

9. The method according to claim 1, wherein the method also comprises checking whether at least one shipment is in the examination area, preferably by means of the radiation source and the sensor device.

10. The method according to claim 9, wherein, for checking whether at least one shipment is in the examination area, the radiation source emits terahertz radiation with a first radiation property.

11. The method according to claim 9, wherein, if the checking reveals that at least one shipment is in the examination area, the radiation source emits terahertz radiation with a second radiation property.

12. The method according to claim 1, wherein, for examining the at least one shipment, terahertz radiation of different power or intensity is emitted into the examination area.

13. The method according to claim 1, wherein, for examining the at least one shipment, terahertz radiation with a first power or intensity is first of all emitted and, in particular if it is determined that the terahertz radiation with the first power or intensity does not suffice to examine the at least one shipment, terahertz radiation with a second power or intensity higher than the first power or intensity is then emitted into the examination area.

14. The method according to claim 1, wherein the at least one shipment is transported by means of a conveyor system into and/or out of the examination area, in particular through the examination area.

15. The method according to claim 1, wherein the at least one shipment is slowed down and/or stopped before and/or in the examination area.

16. The method according to claim 1, wherein the examination area is arranged in a separation area of the conveyor system.

17. The method according to claim 1, wherein the radiation source and/or the sensor device or a part thereof is/are moved during the examination relative to a shipment arranged in the examination area, in particular transversely with respect to a transport direction of a shipment arranged in the examination area, and is/are preferably rotated around a shipment arranged in the examination area.

18. An apparatus for examining shipments, in particular for carrying out a method according to one of the preceding claims, comprising:
an examination area for at least one shipment,
a radiation source for emitting radiation into the examination area for examining the at least one shipment, and
a sensor device for capturing radiation emitted by the radiation source from the examination area,
wherein the radiation source is a terahertz radiation source which covers, for each examination of the at least one shipment, substantially the entire terahertz frequency spectrum from 1 terahertz to 20 terahertz,
wherein the apparatus is further configured to determine, by means of the terahertz radiation which is emitted by the radiation source and captured by the sensor device from the examination area, a) geometrical information of the shipment to be used for controlling the conveyor system transporting the at least one shipment and b) information about one or more objects or substances inside the shipment, including geometrical information of one or more objects inside the shipment, and
wherein the apparatus is further configured to modify and/or enrich reference information on the basis of an examination result of a shipment examined by means of the radiation source and the sensor device in the examination area, said examination result comprising said geometrical information of one or more objects inside the shipment.

19. A non-transitory machine-readable medium comprising a computer program, the computer program comprising program instructions which cause a processor to perform and/or control a method according to claim 1 when the computer program runs on the processor.

* * * * *